United States Patent
Bae et al.

(10) Patent No.: US 8,653,946 B2
(45) Date of Patent: Feb. 18, 2014

(54) PASSIVE RFID READER AND OPERATION CONTROL METHOD THEREFOR

(75) Inventors: Ji-Hoon Bae, Daejon (KR); Hee-Sook Mo, Daejon (KR); Dong-Han Lee, Daejon (KR); Cheng-Hao Quan, Yanji (CN); Chan-Won Park, Daejon (KR); Gil-Young Choi, Daejon (KR); Cheol-Sig Pyo, Daejon (KR); Jong-Suk Chae, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1416 days.

(21) Appl. No.: 11/746,306

(22) Filed: May 9, 2007

(65) Prior Publication Data
US 2008/0122581 A1    May 29, 2008

(30) Foreign Application Priority Data

May 10, 2006  (KR) .................. 10-2006-0042104
May 3, 2007   (KR) .................. 10-2007-0042980

(51) Int. Cl.
*H04Q 5/22*         (2006.01)

(52) U.S. Cl.
USPC .................. 340/10.2; 340/10.1; 340/572.1

(58) Field of Classification Search
USPC ............... 340/10.2, 10.1, 10.3, 572.1, 572.4; 370/447, 448, 461, 462
See application file for complete search history.

(56) References Cited

U.S. PATENT DOCUMENTS

| | | | |
|---|---|---|---|
| 6,633,226 B1 * | 10/2003 | Nysen ......................... | 340/10.1 |
| 2003/0137403 A1 * | 7/2003 | Carrender et al. .......... | 340/10.4 |
| 2005/0280505 A1 * | 12/2005 | Humes et al. ............... | 340/10.1 |
| 2006/0175406 A1 * | 8/2006 | Dressen ....................... | 235/451 |
| 2007/0075838 A1 * | 4/2007 | Powell ......................... | 340/10.2 |
| 2007/0139162 A1 * | 6/2007 | Bandy et al. ................ | 340/10.2 |
| 2007/0206701 A1 * | 9/2007 | Paley et al. .................. | 375/295 |
| 2007/0229226 A1 * | 10/2007 | Soleimani et al. ........... | 340/10.2 |

FOREIGN PATENT DOCUMENTS

| | | |
|---|---|---|
| KR | 10-2004-0056992 | 7/2004 |
| KR | 10-2005-0023701 | 3/2005 |
| KR | 10-2006-0005487 | 1/2006 |
| KR | 10-2006-0062022 | 6/2006 |
| KR | 10-0641380 | 10/2006 |
| KR | 10-2007-0034415 | 3/2007 |

OTHER PUBLICATIONS

"Information Technology—Radio-Frequency Identification for Item Management—Part 6: Parameters for Air Interface Communication at 860 MHz to 960 MHz," ISO/IEC JTC 1/Sc 31/WG 4, ISO/IEC 18000-6:2004/FPDAM 1, Jul. 15, 2005.

* cited by examiner

*Primary Examiner* — Edwin Holloway, III
(74) *Attorney, Agent, or Firm* — H.C. Park & Associates, PLC

(57) ABSTRACT

Provided is a Radio Frequency Identification (RFID) reader that can minimize collision among RFID readers in an environment where there are a plurality of RFID readers within a limited operating environment by making each RFID reader select a channel at different delay time based on a random value, and a method for controlling operation of the RFID reader. The RFID reader includes a random value generating unit; a reader control unit for adaptively deciding a counter value for generating the random value; an anti-collision unit for preventing collision among a plurality of tags; a reader transmitting unit for generating a reader command message determined by the anti-collision unit, encoding the reader command message, and modulating the reader command message; a reader receiving unit for demodulating and decoding a tag signal; and a channel operation control unit for selecting a channel to be used for the communication with the tag.

38 Claims, 6 Drawing Sheets

PASSIVE RFID READER AND OPERATION CONTROL METHOD THEREFOR

CROSS-REFERENCE TO RELATED APPLICATIONS

The present invention claims priority of Korean Patent Application Nos. 10-2006-0042104 and 10-2007-0042980, filed on May 10, 2006, and May 3, 2007, respectively, which are incorporated herein by reference.

BACKGROUND OF THE INVENTION

1. Field of the Invention

The present invention relates to a passive Radio Frequency Identification (RFID) reader and a method for controlling operation of reading tag information in the RFID reader; and, more particularly, to an RFID reader that can minimize collision among RFID readers in an environment where there are a plurality of RFID readers within a limited operating environment by making each RFID reader select a channel at different delay time based on random value, and a method for controlling operation of the RFID reader.

2. Description of Related Art

In general, Radio Frequency Identification (RFID) is a technology for recognizing, tracing, and managing human beings, animals, and/or objects with a tag attached thereto by writing or reading information in or out of a tag having its own identification information without a contact.

An RFID system includes a plurality of electronic tags, or transponders, which will be simply referred to as tags hereinafter, and an RFID reader. Each tag has identification information and it is attached to an object or an animal, and the RFID reader writes or reads information in or out of the tags. RFID systems are divided into a mutual induction type and an electromagnetic wave type according to the communication method between the RFID reader and the tags.

The RFID systems are also divided into an active type and a passive type according to whether the tags are operated with their own power source. They are also divided into a long wavelength RFID reader, an intermediate wavelength RFID reader, a short wavelength RFID reader, an ultra short wavelength RFID reader, and a microwave RFID reader. Diverse specifications are defined or under definition according to the above classification.

Passive RFID wireless equipment used in Korea is defined to perform access in a channel bandwidth of 200 kHz in the range of 908.5 to 914 MHz by using a Frequency Hopping Spread Spectrum (FHSS) or Listen Before Talk (LBT) frequency occupying method. The FHSS frequency occupying method randomly shifts a frequency band to another using the frequency bands of multiple channels for interference avoidance.

The FHSS frequency occupying method was selected by the United States who has a wide frequency band to use. The LBT channel occupying method searches an available channel before transmitting data to share frequencies. If the available channel is searched, the data is transmitted through the searched channel in the LBT channel occupying method, only when the channel is vacant. The LBT channel occupying method is selected as a standard channel occupying method in Europe who has a narrow frequency band to use.

In South Korea, the number of channels for an RFID system is limited to 27 in a bandwidth of 5.5 MHz. Thus, more channel regions are allocated to the LBT channel occupying method than to the FHSS method. According to the LBT channel occupying method, an RFID reader senses the occupancy status of a channel and, only when the channel is vacant, an RFID reader transmits commands to a tag. Therefore, the RFID reader of the LBT method should not only have a high reception performance but also be able to sense the occupancy status of a channel. In a case where a conventional LBT method is used, the structure of an RFID reader becomes complicated. Also, although the number of RFID readers is relatively smaller than other regions, the channel should be able to be sensed necessarily.

SUMMARY OF THE INVENTION

An embodiment of the present invention is directed to providing a Radio Frequency Identification (RFID) reader that can minimize collision among RFID readers in an environment where there are a plurality of RFID readers within a limited operating environment by making each RFID reader select a channel at different delay time based on random value.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, there is provided an RFID reader, which includes: a random value generating unit for generating a random value for each RFID reader to select a channel at different delay time; a reader control unit for adaptively deciding a counter value for generating the random value, and when the listen time as long as the random value generated in the random value generating unit is ended, making a command to select a channel for communication with a tag, and controlling entire operation for acquiring information from the tag; an anti-collision unit for performing control to prevent collision among a plurality of tags and transmitting a communication result between the RFID reader and the tag to the reader control unit; a reader transmitting unit for generating a reader command message determined by the anti-collision unit, encoding the reader command message, and modulating the reader command message; a reader receiving unit for demodulating and decoding a tag signal received through an antenna and reporting a tag response status to the anti-collision unit; and a channel operation control unit for selecting a channel to be used for the communication with the tag upon receipt of a command of the reader control unit.

In accordance with another aspect of the present invention, there is provided a method for controlling operation of an RFID reader in an RFID system having a plurality of RFID readers within an operating environment, which includes the steps of: a) selecting a random value to select a channel at different delay time for each RFID reader; b) listening as long as the selected random value and occupying a channel for communication with a tag based on a channel occupying method decided by an operator; c) communicating with the tag through the occupied channel; and d) processing tag information based on a communication result between the RFID reader and the tag.

In accordance with another aspect of the present invention, there is provided a method for controlling operation of an RFID reader in an RFID system having a plurality of RFID readers within an operating environment, which includes the steps of: a) selecting a random value to select a channel at different delay time for each RFID reader; b) listening as long as the selected random value and establishing a channel for communication with a tag; c) communicating with the tag through the established channel; and d) processing tag information based on a communication result between the RFID reader and the tag.

DESCRIPTION OF SPECIFIC EMBODIMENTS

The advantages, features and aspects of the invention will become apparent from the following description of the embodiments with reference to the accompanying drawings, which is set forth hereinafter. Also, when it is considered that detailed description on a prior art may obscure the point of the present invention, the description will not be provided herein. Hereinafter, specific embodiments of the present invention will be described in detail with reference to the accompanying drawings.

Figure 1A:
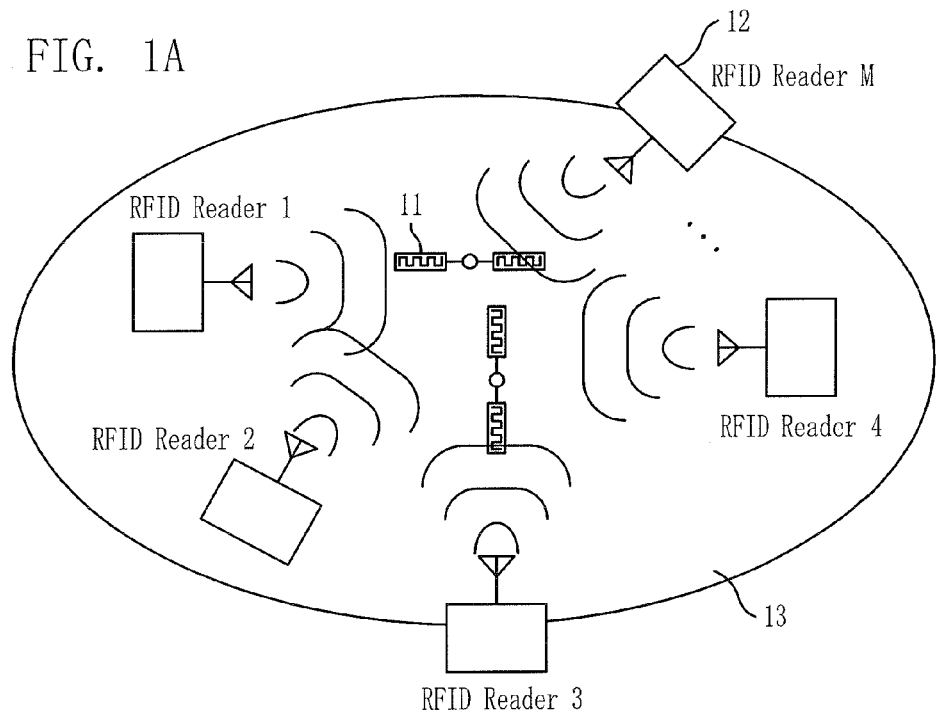
FIGS. 1A and 1B show a passive Radio Frequency Identification (RFID) application in an environment where RFID readers are crowded.
Figure 1B:
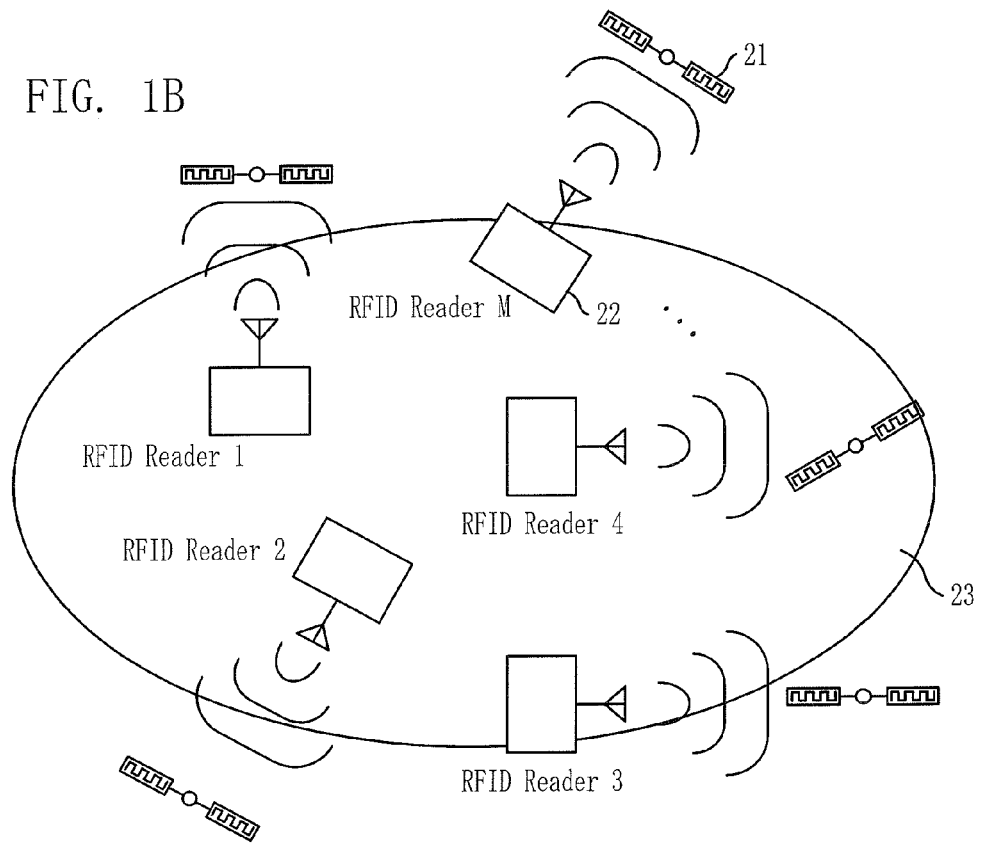

FIGS. 1A and 1B show a passive Radio Frequency Identification (RFID) application in an environment where RFID readers are crowded. FIG. 1A shows a mobile RFID environment where there are many RFID readers and a few tags.

In the mobile RFID environment, the number of RFID readers 12 around a tag 11 is generally more or less than 10 and the operating environment 13 is not wider than 1 m. In short, FIG. 1A shows an environment where there are two tags 11 and M RFID readers 12 within the operating environment 13.

In the environment of FIG. 1A where the number of RFID readers in a predetermined operating environment 13 is limited and the time taken for an RFID reader to read the identification (ID) information of a tag is as short as a few milliseconds (msec), a channel access method that can minimize collision between RFID readers having a simple structure, while not using a Frequency Hopping Spread Spectrum (FHSS) and Listen Before Talk (LBT). Whereas FIG. 1A shows an environment where multiple RFID readers identify a tag, FIG. 1B shows an environment where multiple RFID readers 22 identify a few tags 21 in the operating environment 23, each of the RFID readers reading a corresponding tag. Examples of the environment of FIG. 1B are a conveyer environment of a fixed RFID system and a hand-held-type mobile RFID environment where a few tags are identified.

Figure 2:
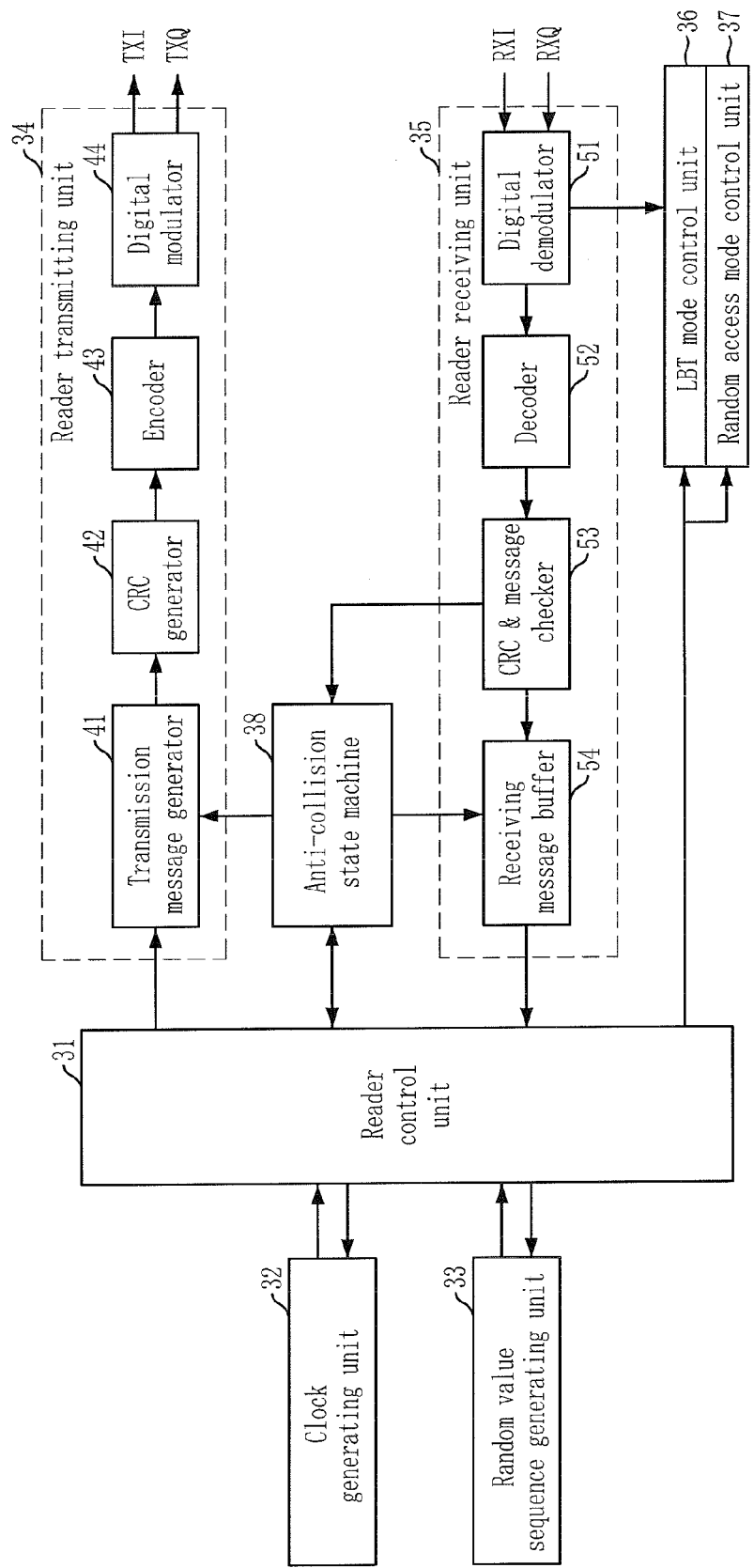
FIG. 2 is a block diagram illustrating an RFID reader in accordance with an embodiment of the present invention.

FIG. 2 is a block diagram illustrating an RFID reader in accordance with an embodiment of the present invention. The RFID reader of the present invention communicates with a passive RFID tag using an Ultra-High Frequency (UHF) band. Hereinafter, an example where the RFID reader of the present invention is operated based on the ISO/IEC 18000-6C International Standard Specification, which is an RFID protocol specification in the UHF band ranging from 860 MHz to 960 MHz.

As shown in FIG. 2, the RFID reader includes a reader control unit 31, a reader transmitting unit 34, a reader receiving unit 35, an anti-collision state machine 38, an LBT mode control unit 36, a random access mode control unit 37, a reader control unit 31, and a random value sequence generating unit 33. The reader control unit 31 receives commands for operating the RFID reader from an operator. The reader transmitting unit 34 transmits reader commands through reader-to-tag communication. The reader receiving unit 35 receives data from a tag. The anti-collision state machine 38 controls collision among a plurality of tags in the communication with the tag. The LBT mode control unit 36 performs control according to an LBT mode. The random access mode control unit 37 performs control according to a random access mode. The random value sequence generating unit 33 generates a random value sequence and transmits it to the reader control unit 31.

The random value sequence generating unit 33 generates a random value sequence within a range of 0 to $2^R-1$ and transmits the random value sequence to the reader control unit 31 so that each RFID reader selects a channel at different delay time according to an R slot counter value set up by the reader control unit 31.

The reader control unit 31 sets up the R counter value to be large when there are many RFID readers within an operating environment after monitoring the communication status with a current tag. When there are a small number of RFID readers within the operating environment, it sets up a small R slot counter value. Generally, an RFID reader remains in the state of RF power-off before it selects a channel.

Therefore, when the R slot counter value is set up large, the RF power-off state lasts long, to thereby alleviate collision among a plurality of RFID readers. When the R slot counter value is set up small, the channel selection waiting time of the RFID reader becomes short.

In the present invention, the reader control unit 31 sets up the R slot counter value adaptively according to current status, to thereby minimize collision between the RFID readers. Meanwhile, the function of the random value sequence generating unit 33 may be accommodated in the reader control unit 31.

The reader control unit 31 controls diverse registers inside an RFID reader, and an address pin used to control the registers is defined based on the number of the internal registers to be used. Also, the reader control unit 31 may use a chip selection signal, a read signal, a write signal, an output enable signal to control the registers.

Meanwhile, the reader control unit 31 controls the blocks shown in FIG. 2, and it uses a synchronous interface for Central Processing Unit (CPU) clocks with the blocks. The reader control unit 31 may be able to determine whether to use an LBT method or a random access method to communicate with a tag according to the present invention. The reader control unit 31 also sets up a necessary LBT parameter in the LBT mode control unit 36 according to the determined method or it sets up a random access parameter in the random access mode control unit 37.

The reader control unit 31 determines an R slot counter value of the random value sequence generating unit 33, selects one random value among the random value sequence generated by the random value sequence generating unit 33, and waits until the selected random value becomes 0. Subsequently, when the selected random value is 0, the reader control unit 31 transmits a signal for starting channel access to the LBT mode control unit 36 or the random access mode control unit 37 according to the determined channel access mode. The reader control unit 31 sets up in a transmission message generator 41 reader commands needed to communicate with a tag, and receives tag information including an Electronic Product Code (EPC) acquired from the communication with the tag from a receiving message buffer 54.

The reader transmitting unit 34 includes a transmission message generator 41, a Cyclic Redundancy Check (CRC) generator 42, an encoder 43, and a digital modulator 44.

The transmission message generator 41 generates command messages to be transmitted to the tag upon receipt of a command of the anti-collision status machine 38. The generated messages include commands used in the process of 'Inventory' such as 'Query,' 'QueryAdjust,' 'QueryRep,' and 'Ack,' and commands used in the process of 'Access' such as 'Req_RN,' 'Read,' and 'Write.' The CRC generator 42 generates CRC for frames of the above-generated transmission message and adds the CRC to the transmission message. The generation and addition of the CRC may be carried out in the transmission message generator 41.

The encoder 43 encodes message data transmitted through the transmission message generator and the CRC generator. According to the International Standard ISO/IEC 18000-6C Specification, the encoder 43 performs Pulse-Interval Encoding (PIE). Also, the digital modulator 44 receives the encoded data from the encoder 43 and generates and shapes a wavelength form for DSB-ASK or PR-ASK. The digital modulator 44 may include a Root Raised Cosine (RRC) filter for shaping the wavelength form of the encoded data properly to the International Standard ISO/IEC 18000-6C.

In this case, the RRC filter limits unnecessary band in the RF terminal, removes interference among symbols, and shapes a normalized envelope for communication with the tag. The signals outputted from the digital modulator 44 are inputted to a Digital-to-Analog Converter (not shown) to be converted into analog signals. The analog signals are up-converted into the UHF band, amplified, and then transmitted to the tag through a reader antenna.

Meanwhile, the reader receiving unit 35 includes a digital demodulator 51, a decoder 52, a CRC and message checker 53, and a receiving message buffer 54.

The digital demodulator 51 according to the present embodiment receives a digital signal downlink transformed and converted after receiving the signal through a reader antenna and performs a digital demodulation such as amplitude shift keying (ASK) demodulation scheme. Also, the digital demodulator 51 measures a Received Signal Strength Indication (RSSI) of a receiving signal according to the present embodiment and reports the measured RSSI to the LBT mode control unit 36.

The decoder 52 receives the demodulated signal from the digital demodulator and performs a FM0 (Frequency Modulation 0) or Miller Sub-carrier decoding.

The CRC and message checker 53 checks whether there is an error in the CRC by calculating the CRC of the tag data transmitted from the decoder, analyzes a tag information message, and reports a tag response status and whether there is an error in the CRC to the anti-collision state machine 38. Since the CRC and message checker 53 according to the present embodiment calculates and checks the CRC of a received data, the load of the reader control unit 31 can be reduced in the present embodiment.

The receiving message buffer 54 buffers the receiving message data transmitted from the CRC and message checker 53. It also transmits the buffered tag data, e.g., EPC or user specific data, to the reader control unit 31 upon receipt of a command from the anti-collision state machine 38.

The anti-collision state machine 38 controls the operation of the RFID reader for the reader-to-tag communication upon receipt of a command from the reader control unit 31. To be specific, when the anti-collision state machine 38 receives a command for starting communication with the tag from the reader control unit 31, it controls the transmission message generator to generate a reader command. Also, the anti-collision state machine 38 reports tag information reception state, which is transmitted from the CRC and message checker 53, to the reader control unit 31, and determines a reader command to be transmitted to the tag based on the tag information state reported by the CRC and message checker 53. Also, when the reader receiving unit 35 has successfully acquired tag information including EPC, it controls the receiving message buffer 54 to transmit the acquired tag information, which includes EPC or user-specific data, to the reader control unit 31.

Meanwhile, the anti-collision state machine 38 prevents collision between tags in the reader-to-tag communication. Anti-collision means a process that the RFID reader identifies one tag among a plurality of tags and acquires tag information of the tag. Reader commands used in the anti-collision process include 'Select,' 'Query,' and 'QueryRep.'

The LBT mode control unit 36 receives a variable for executing LBT from the reader control unit 31 and executes the LBT. To be specific, the LBT mode control unit 36 generates a frequency channel index sequence to search for a channel to be used in communication with the tag, and receives a Received Signal Strength Indication (RSSI) from the digital demodulator 51, and RSSI is selected based on the generated channel index sequence. Then, the LBT mode control unit 36 determines whether there is an empty channel by comparing the received RSSI with a predetermined threshold value, determines a channel to be used for the communication with the tag, and transmits the result to the reader control unit 31 or the anti-collision state machine 38 to thereby start communication with the tag.

Meanwhile, the random access mode control unit 37 receives a variable from the reader control unit 31 and executes a channel access. To be specific, the random access mode control unit 37 turns on a power source of an RF unit under the control of the reader control unit 31, sets up a Phase Locked Loop (PLL) at a predetermined value, and occupies one channel. The random access mode control unit 37 informs the reader control unit 31 or the anti-collision state machine 38 of the occupancy of the channel, and starts communication with the tag.

The LBT mode control unit 36 and the random access mode control unit 37 may share a PLL controller (not shown) that generates control parameters PLL_CLK, PLL_DATA, and PLL_ENABLE for PLL of the RF unit (not shown). That is, the LBT mode control unit 36 and the random access mode control unit 37 may perform a uniformly distributed random numbers generation function by sharing a PLL R, N, F counter table for PLL control.

A clock generating unit 32 generates and supplies clock and control signals used in the RFID reader. Since the clock generating unit 32 has a timer for operating the reader control unit 31 in real-time, it can reduce the load of the reader control unit.

Figure 3A:
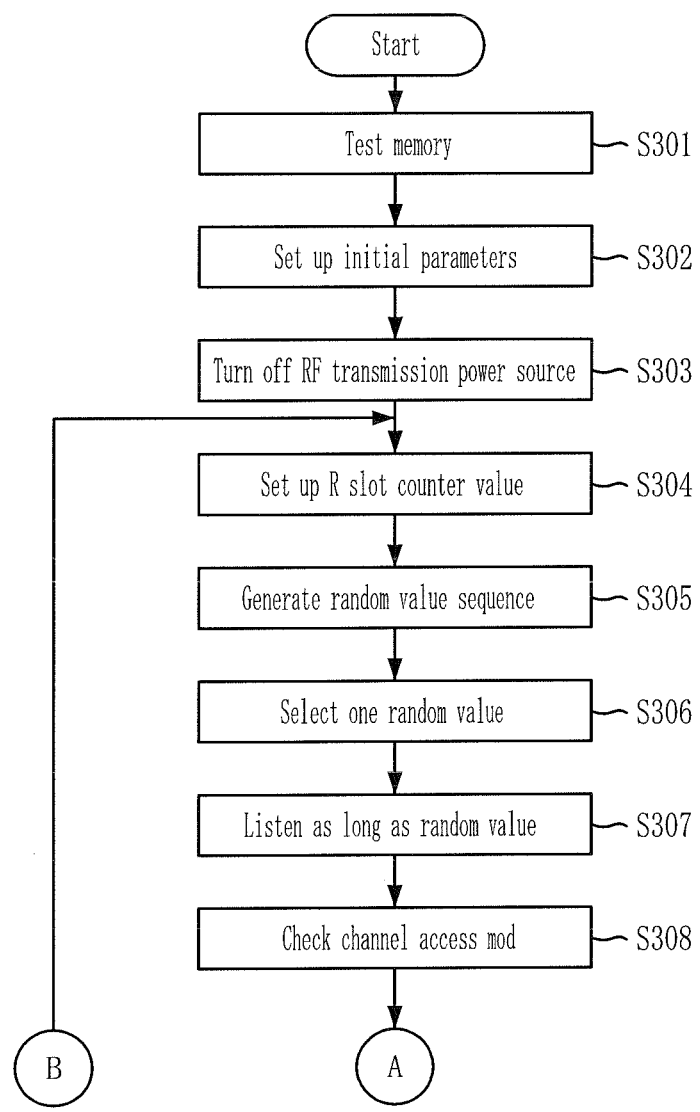
FIGS. 3A and 3B is flowcharts describing a method of controlling the operation of an RFID reader in accordance with an embodiment of the present invention.
Figure 3B:
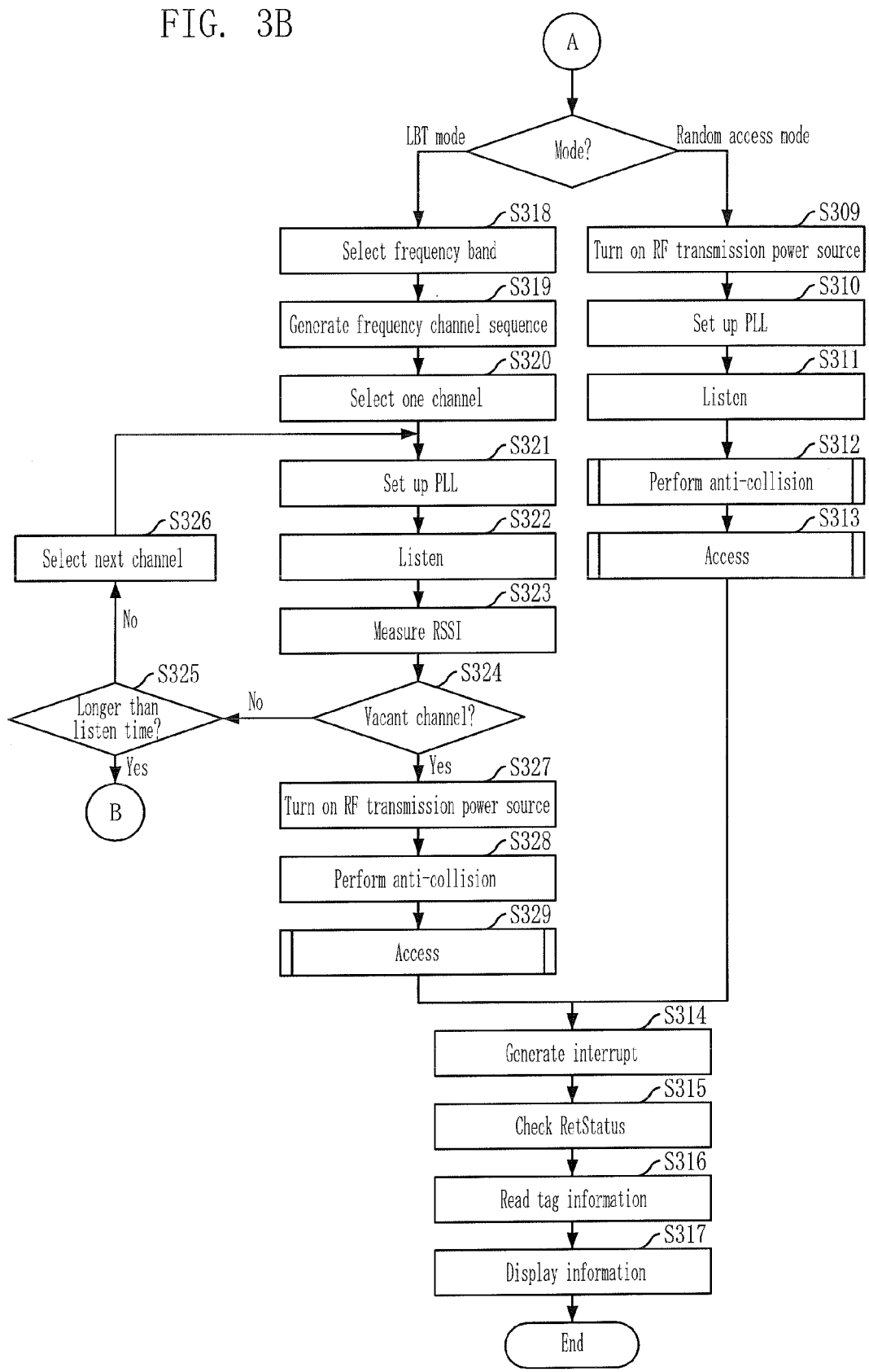

FIGS. 3A and 3B is flowcharts describing a method of controlling the operation of an RFID reader in accordance with an embodiment of the present invention.

According to the method of the present invention, an operator selects one that is suitable for an environment where RFID readers are crowded between the LBT mode and a random access mode. When the number of RFID readers is relatively small such as a mobile RFID reader environment, the random access mode is selected instead of the LBT mode to minimize the chances of collision between RFID readers.

According to the method of controlling the operation of an RFID reader, a memory is tested in step S301 and commands and basic parameters are setup in step S302. In steps S303 to S307, a random value is created for each RFID reader to select a channel at different delay time, and random listen which is an action that an RFID reader waits is executed as long as the created random value. In steps S309 to S311 and steps S318 to S327, a channel is occupied based on the established channel access mode. In steps S312, s313, S328 and S329, tag information is acquired through anti-collision process through the occupied channel, or through an access process. In steps S314 to S317, the acquired tag information is processed.

The operation controlling method of the present invention will be described with reference to FIGS. 3A to 5, hereinafter.

When the power source of the RFID reader is turned on, a reader control unit tests the initial operation of the RFID reader including a memory to check whether there is a problem with the RFID reader in step S301. When there is an error in the initial operation test, the reader control unit reports it by transmitting an RFID reader operation error message to a host.

When it turns out that the RFID reader operates normally, in step S302, the reader control unit initializes diverse parameters needed for the operation of the RFID reader, such as channel access and anti-collision for tags the number of which is smaller than the number of RFID readers within an operating environment. Herein, the reader control unit sets up the parameters according to the selected frequency occupying method. The frequency occupying method may be selected by an operator or an external device, or it may be selected by the reader control unit. When the frequency occupying method is selected, reader operation environment as many as the number of the RFID readers existing in the operating environment may be referred to.

To execute a channel access in the LBT mode, a frequency band to be used, the maximum listen time for searching a vacant channel, a maximum talk time for communication with a tag, and an RSSI threshold value for determining whether a channel is vacant or not should be set up in advance.

Herein, the maximum talk time means the maximum time for executing a communication between an RFID reader and a tag through anti-collision and access processes. The RFID reader identifies the small number of tags during the maximum talk time. In the LBT method, the RFID reader communicates with a tag occupying one channel for the maximum talk time. Therefore, when each RFID reader finishes identifying tags corresponding thereto in an environment where a plurality of RFID readers identify tags less than the number of the RFID readers, the RFID reader turns off the transmission power source of the RF unit to minimize its interference on the operation of other RFID readers. The maximum talk time may be set up arbitrary by the operation in such a manner that it is proper to the environment where RFID readers are crowded.

The maximum listen time means the maximum time for searching for a vacant channel after the transmission power source of the RF unit is turned off.

When the parameters are set up according to the channel access mode, the reader control unit sets up reader commands needed for communication with a tag in the transmission message generator.

After the initial steps of the RFID reader are executed, the reader control unit directs the LBT mode control unit or the random access mode control unit to turn off the transmission power source of the RF unit in step S303. Subsequently, the reader control unit sets up an R slot counter value that is pre-defined based on the RFID reader environment within an operating environment and the established channel access mode in step S304. Herein, R denotes an internal parameter that an RFID reader uses when it accesses to a channel.

Each RFID reader selects a channel at different delay time based on the R slot counter value. In step S305, the random value sequence generating unit generates a random value sequence in the range of 0 to $2^R-1$ based on the R slot counter value set by the reader control unit by loading a random seed value. Herein, the random value sequence generating unit changes the random seed value for each execution of an algorithm so that the random value sequence is generated irregularly. In step S306, the reader control unit selects any one random value among the generated random value sequences in the range of 0 to $2^R-1$.

The reader control unit listens, or waits, as long as the selected random value. In other words, the reader control unit discounts the selected random value until the random value becomes 0 in step S307, which is a 'listen' process.

When the selected random value is not 0, the reader control unit waits for a predetermined time, i.e., T millisecond, and decreases the random value by 1. The reader control unit repeats the process and when the selected random value is 0, it checks the established channel access mode in step S308.

When the established channel access mode is a random access mode, the reader control unit directs the random access mode control unit to occupy a channel. Accordingly, the random access mode control unit turns on the transmission power source of the RF unit and sets up a PLL frequency corresponding to the channel in steps S309 and S310. Herein, the random access mode control unit may use a predetermined frequency channel or occupy a channel by selecting any one among channel frequency sequences determined by the operator.

Also, after setting up a PLL frequency, the random access mode control unit waits for a predetermined time, e.g., 1.5 msec, to acquired time needed to set up the PLL value in step S311. When one channel is occupied, the random access mode control unit informs the reader control unit and the anti-collision state machine of the occupancy of the channel. Subsequently, an anti-collision process and an access process are executed in steps S312 and S313, respectively, which will be described later with reference to FIGS. 4 and 5.

When the anti-collision state machine acquires tag information, it generates an interrupt and transmits it to the reader control unit in step S314. When no interrupt is generated, the reader control unit reports to the host of the interrupt failure.

The anti-collision state machine reports the state (RetStatus) of the information transmitted from the tag to the reader control unit. The RetStatus information includes OK, NO_TAG, CRC_ERR. Herein, OK signifies a case where data transmitted from the tag is normally processed, and NO_TAG signifies a case where the tag does not make a response. CRC_ERR signifies a case where an error is detected after CRC checking.

The reader control unit checks the RetStatus information in step S315 and, when the RetStatus information is OK, it reads tag information and reports the tag information to the host or a middleware in step S316. In step S317, the tag information is displayed.

Herein, when the RetStatus information is not OK, the reader control unit increases an nFail counter value, which signifies the number of failure and compares the failure counter number (nFail) with a pre-defined maximum value (N). As a result of the comparison, when the failure counter number (nFail) is smaller than the maximum value (N), the collision adjustment process is repeated. When the failure counter number (nFail) is greater than or equal to the maximum value (N), the reader control unit increases the R slot counter value by a predetermined increase value (dR) and repeats the process from the step of generating a random value sequence. Therefore, the method of the present invention can reduce the chance of collision among RFID readers by monitoring the state of communication with the current tag and adaptively changing the R slot counter value, even when the number of RFID readers increases.

Hereinafter, a case where the channel access mode is the LBT mode will be described. When the channel access mode is the LBT mode and there are many RFID readers, the reader control unit increases the R slot counter value. This makes it long time to turn off the power source, which minimizes the collision among the RFID readers. Also, the reader control unit decreases the R slot counter value when there are a few RFID readers to thereby minimize the waiting time for channel selection.

When the selected random value is 0 and the waiting time ends, the reader control unit directs the LBT mode control unit to occupy a channel. The LBT mode control unit selects a frequency band based on the information on a frequency band to be used in the initial process in step S318.

The LBT mode control unit generates a frequency channel index sequence based on a random seed within the selected frequency band in step S319. The LBT mode control unit selects one channel from the generated frequency channel index sequence in step S320, and transmits a PLL control signal for receiving the selected channel to the RF unit in step S321. Herein, the LBT mode control unit waits for a predetermined time, for example, 1.5 msec., to set up the PLL value for stable operation in step S322.

When the PLL value is set up, the digital demodulator receives signals of the channel, and measures the RSSI. The LBT mode control unit receives the RSSI that is measured in the digital demodulator, compares it with an initial threshold value (LISTEN_RSSI_THRESHOLD), which is set up in the initial stage, and determines whether the channel is vacant based on the comparison result in steps S323 and S324.

When the measured RSSI is greater than the threshold value, it means that another RFID reader uses the channel. Thus, the LBT mode control unit selects the next channel in the frequency channel index sequence in step S326, sets up the PLL value again, and repeats the process of measuring the RSSI. Herein, when the maximum listen time (MAX_LISTEN_TIME) for searching for a vacant channel established in the initial step passes in step S325, the LBT mode control unit reports it to the reader control unit and goes to the step S304 of establishing the R slot counter value and repeats the subsequent process.

When the vacant channel is searched and one channel is occupied, the LBT mode control unit reports it to the reader control unit or the anti-collision state machine and transmits a control signal for turning on the transmission power source of the RF unit in step S327. Upon receipt of the control signal, the RF unit including a frequency up-converter and a transmission power amplifier is turned on to transmit reader commands, upon receipt of the control signal.

The RFID reader begins a reader-to-tag communication, which is referred to 'talk,' through the one channel occupied by the LBT mode control unit. The reader-to-tag communication includes an anti-collision step S328 for avoiding collision among the RFID readers and acquiring EPC from one tag and a tag access step S329 of acquiring user-specific data stored in a user memory of the tag. The reader-to-tag communication process will be described later with reference to FIGS. 4 and 5.

The LBT mode control unit includes a talk timer for managing time for the RFID reader to execute the talk with the tag and it checks whether the time for RFID reader to execute the talk with the tag exceeds the maximum talk time (N[sec]) established in the initial process. When the talk time is longer than the maximum talk time (N[sec]), the LBT mode control unit transmits a control signal for ending the communication with the tag, i.e., talk, to the anti-collision state machine, turns off the transmission power source of the RF unit, reports it to the reader control unit, and goes back to the step of setting up the R slot counter value and repeats the subsequent process.

Conversely, when tag information acquisition is failed but the talk time is shorter than the maximum talk time (N[sec]), the LBT mode control unit talks with the tag from the anti-collision step.

Subsequently, an interrupt occurs and the reader control unit processes the tag information in the same method that is described above, it will not be described herein.

Hereinafter, the anti-collision process and the tag access process of FIG. 3 will be described in detail with reference to FIGS. 4 and 5.

The communication process with the tag is divided into the anti-collision step and the tag access step. Whether to execute the tag access step is determined based on a word count (nWordC) parameter included in a read command for reading the user memory. When the word count parameter (nWordC) is 0, the RFID reader executes only the anti-collision step. When the word count parameter (nWordC) is not 0, the RFID reader additionally executes the tag access step based on EPC data acquired from the anti-collision step.

The communication with the tag is controlled by the anti-collision state machine. The anti-collision state machine controls the operation of the RFID reader for communication with the tag according to the reception state of the tag information transmitted from the CRC and message checker RFID reader, and the anti-collision state machine transmits status information, which is the RetStatus on signals transmitted from the tag. The status, which is TagResp, of the signals transmitted from the tag includes 'TagResp==OK' which is a case when tag information is successfully received from the tag, 'TagResp==No_Resp' which is a case when no response is received from the tag, and 'Tag_Resp==CRC_ERR' which is a case when there is an error in the CRC of tag data.

Figure 4:
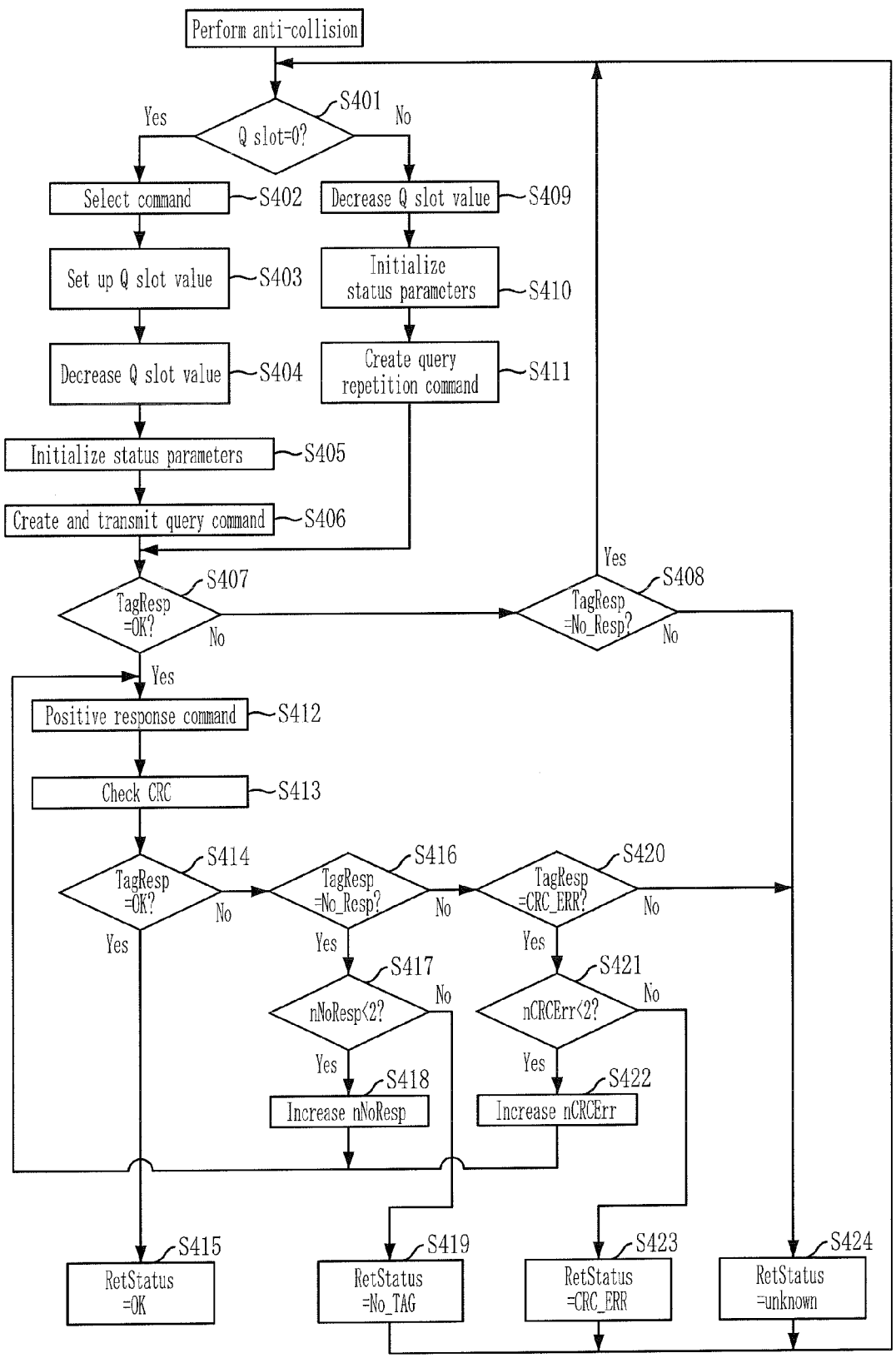
FIG. 4 is a flowchart describing an anti-collision process of FIG. 3.

FIG. 4 is a flowchart describing operation of the RFID reader in the anti-collision step for preventing collision among a plurality of tags and acquiring EPC from one tag. One tag information, i.e., EPC data, is acquired from the anti-collision in a sequence of selection, query and ack. To acquire tag information, i.e., EPC data, of the other tags whose slot is not 0, a query repeat (QueryRepeat) command is used.

Referring to FIG. 4, when a channel is occupied for communication with the tag and the Q slot counter value is 0, the anti-collision state machine commands the transmission message generator to generate a select command in step S401 and S402. Also, the anti-collision state machine determines the Q value and then sets up the Q slot counter value ($Q_{slot}$) as '$2^Q-1$' in step S403. In step S404, the status parameters, e.g., TagResp, nNoResp, and nCRCErr, are initialized.

In the embodiment of the present invention, 2 is selected as the Q value (Q=2), which means there are 4 slots, to read the small number of tags in the mobile RFID environment. Herein, the Q value is a slot counter value for the RFID reader to listen to the entire slots one by one. The RFID reader sets up a predetermined Q value to prevent collision among the tags, and the slot counter listens to the tag of a slot by decreasing the slot counter value according to the above-established Q value. Subsequently, when the slot counter value is 0, listening to all the slots set up in the above is completed.

Then, the anti-collision state machine instructs the transmission message generator to generate a Query command including the Q value information. The reader transmitting unit generates the Query command and transmits the Query command to a tag so as to begin the Inventory operation in step S406. The response signal for the Query command from the tag is decoded by the decoder, and the decoded signal is transmitted to the CRC and message checker. The CRC and message checker reports the reception state of the tag data to the anti-collision state machine. The anti-collision state machine informs the no-response state to the reader control unit when no response is received from the tag (TsgResp==No_Resp) in step S408. Then, the anti-collision state machine reduces the slot value $Q_{slot}$ by one, initializes the status parameters, and instructs the transmission message generator to generate a QueryRep command in steps S409 to S411. Herein, if the slot value is 0, the logic flow goes back to the step S401 and repeats the subsequent processes.

If a tag response for the Query command generated in the step S406 or a tag response for the QueryRep command generated in the step S411 is OK, the anti-collision state machine instructs the transmission message generator to generate an Ack command in step S412. The CRC and message checker checks a CRC of the tag response signal for the Ack command and transfers the tag response status information and the CRC check result to the anti-collision state machine in step S413. The anti-collision state machine transmits the Ack command twice in steps S417 and S418 when no tag response is received. It informs the reader control unit of the state of no tag response state (RetStatus==No_TAG) in step S419 when there is no response from the tag continuously.

The anti-collision state machine transmits the Ack command twice in step S421 and S422 when there is an error in the CRC of received data from the tag. If the CRC error is continually found, the anti-collision state machine informs the reader control unit of the error in the CRC (RetStatus=CRC_ERR) in step S423.

As described above, if the tag response for the Ack command is not successfully received, the logic flow goes back to the step S409 to obtain tag information having a different slot value and the subsequent processes are repeated.

Meanwhile, if the tag response for the Ack command is successfully received, the anti-collision state machine transfers the status information RetStatus==OK to the reader control unit to inform that the tag response is successfully received, and generates an interrupt for the reader control unit to read the tag data in step S415. The ant-collision state machine determines whether the tag access step is performed or not according to a word count (nWordC) value which is a parameter for reading user data. If the value of word count is 0 and the Q slot value is 0, the anti-collision state machine terminates the anti-collision step. On the contrary, if the Q slot value is not 0, the logic flow goes to step S409 to obtain tag information having a different slot value.

Figure 5:
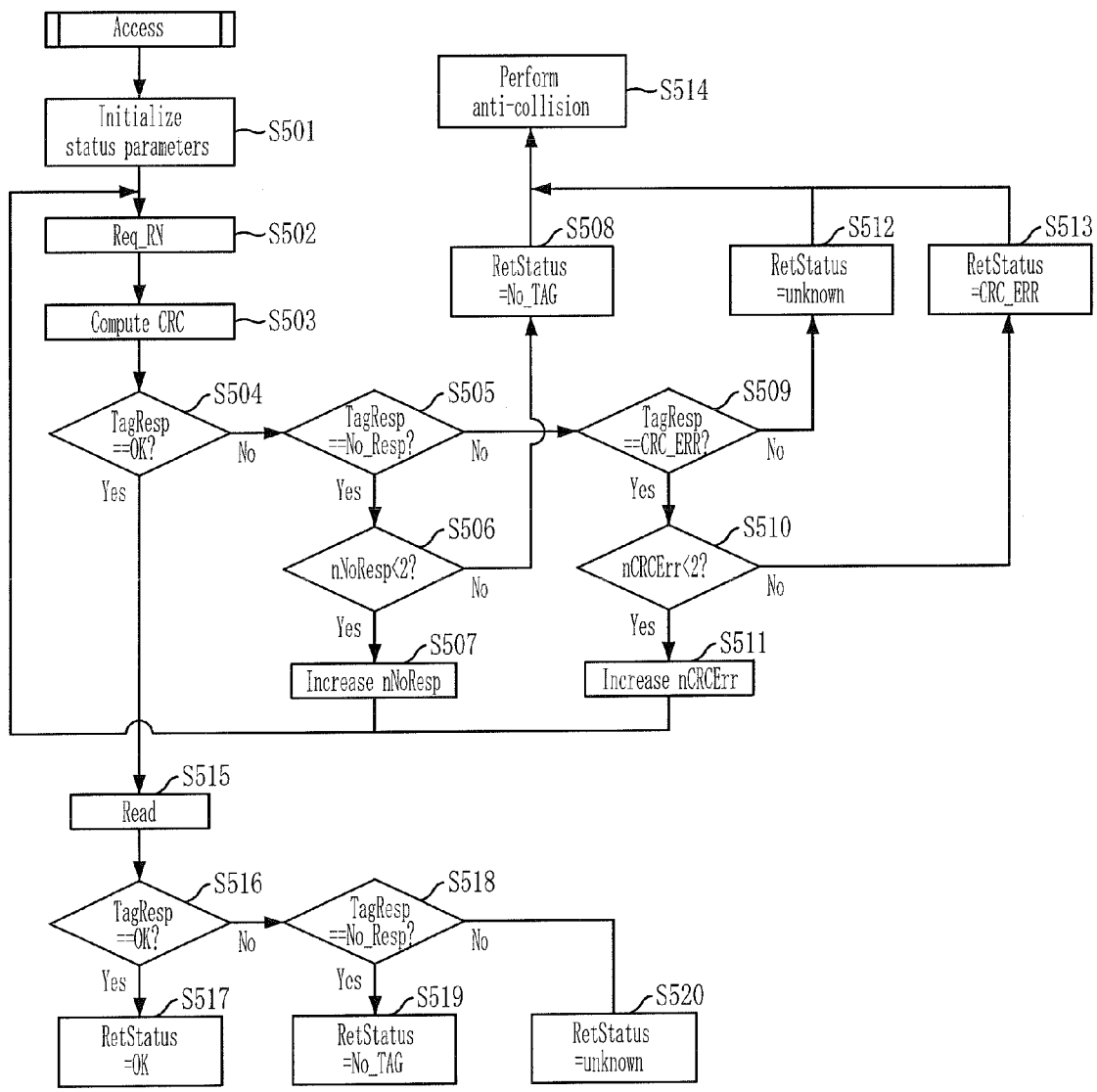
FIG. 5 is a flowchart describing a tag access process of FIG. 3.

FIG. 5 is a flowchart describing the operation of an RFID reader in the tag access step in accordance with an embodiment of the present invention. The tag access step is performed when the word count (nWordC) value is not 0, which is included in a read command, and user-specific data of a user memory is obtained using EPC tag data obtained from the anti-collision step.

Referring to FIG. 5, the anti-collision state machine initializes status parameters in step S501, and instructs the transmission message generator to generate a Req_RN command in step S502. The tag receiving the Req_RN command transmits its state to an open state or a secured state for enabling a read and write operations in the tag. Meanwhile, the CRC and message checker checks the CRC of a tag response signal for the Req_RN command in step S503, and transfers the tag response status information with whether the CRC error is present or not to the anti-collision state machine. The anti-collision state machine transmits the Req_RN command twice in steps S506 and S507 when the anti-collision state machine does not receive the response from the tag (TagResp==No_Resp). If the tag response is not received continually, the anti-collision state machine informs the reader control unit that there is no response from the tag (RetStatus=No_TAG) in step S508. The anti-collision state machine transmits the Req_RN command twice when the error is present in the CRC of tag data in step S510 and S511. If the CRC error is continually generated, the anti-collision state machine informs the reader control unit of the CRC error state (RetStatus==CRC_Err) in step S513. The RFID reader executes the anti-collision step of FIG. 4 in step S514 if the tag response for the Req_RN is not successful.

If the tag response for the Req_RN command is successfully received, the anti-collision state machine commands the transmission message generator to generate a read command to obtain user-specific data of the tag in step S515. The CRC and message checker informs the anti-collision state machine of the reception state of a tag signal from the read command. The anti-collision state machine informs the reader control unit of no tag response in step S519 when no tag response is received for the read command. If the tag response for the read command is successfully received, the anti-collision state machine informs it (RetStatus=OK) to the reader control unit, and generates an interrupt for the reader control unit to read user-specific data in step S517.

As described above, the technology of the present invention can adaptively cope with an environment where there are a large number of RFID readers having a simple structure and a relatively small number of tags within a limited operating environment by using a random value and thus making each RFID reader select a channel with a different delay time.

Also, whereas the status of all channels are sensed for a predetermined time in the conventional LBT method, the technology of the present invention reduces chances for collision between RFID readers by adaptively controlling the sensing time and making each RFID reader occupy a channel directly when there is a vacant channel, instead of examining all the channels.

While the present invention has been described with respect to the specific embodiments, it will be apparent to those skilled in the art that various changes and modifications may be made without departing from the spirit and scope of the invention as defined in the following claims.

What is claimed is:

1. A Radio Frequency Identification (RFID) reader, comprising:
   a random value generator to generate a random value for each RFID reader to select a channel at different delay time;
   a reader controller configured to adaptively select a counter value for generating the random value, and when the listen time as long as the random value generated in the random value generator is ended, make a command to select a channel for communication with a tag, and control an operation to acquire information from the tag;
   an anti-collision unit configured to control to prevent collision among a plurality of tags and transmit a communication result between the RFID reader and the tag to the reader controller;

a reader transmitting unit to generate a reader command message determined by the anti-collision unit, encode the reader command message, and modulate the reader command message;

a reader receiving unit to demodulate and decode a tag signal received through an antenna and report a tag response status to the anti-collision unit; and a channel operation controller configured to select a channel to be used for the communication with the tag upon receipt of a command of the reader controller, wherein the channel operation controller comprises:
  a Listen Before Talk (LBT) mode controller to execute LBT control; and
  a random access mode controller to control a random access method.

2. The RFID reader of claim 1, wherein the reader controller is configured to adaptively select the counter value based on an environment of an operating environment of the RFID reader.

3. The RFID reader of claim 2, wherein the reader controller is configured to make the listening time for selecting a channel long by increasing the counter value, when there are a large number of RFID readers in the operating environment; and make the listening time for selecting a channel short by decreasing the counter value, when there are a small number of RFID readers in the operating environment.

4. The RFID reader of claim 1, wherein the random value generator generates a random value sequence within a range of 0 to $2^R-1$ based on the arbitrary counter value R set by the reader controller.

5. The RFID reader of claim 4, wherein the random value generator generates a random value sequence by changing a random seed value for each execution of an algorithm to irregularly generate the random value sequence.

6. The RFID reader of claim 4, wherein the reader controller is configured to select any one value from the generated random value sequence according to the environment within the operating environment of the RFID reader.

7. The RFID reader of claim 1, wherein the reader controller is configured to select any one between the LBT mode and the random access mode as a channel occupying method to be used for communication with a tag.

8. The RFID reader of claim 7, wherein the LBT mode controller and the random access mode controller share a Phase Locked Loop (PLL) controller.

9. The RFID reader of claim 7, wherein the LBT mode controller is configured to perform control to turn on a transmission power source of an RF unit upon receipt of a channel selection command from the reader controller and to occupy a channel based on the LBT method.

10. The RFID reader of claim 7, wherein the random access mode controller is configured to turn on a transmission power source of an RF unit upon receipt of a channel selection command from the reader controller and select a PLL frequency for setting up a channel.

11. The RFID reader of claim 10, wherein the random access mode controller is configured to set up the PLL to occupy a pre-defined frequency channel.

12. The RFID reader of claim 10, wherein the random access mode controller is configured to select any one from a channel frequency sequence pre-defined by an operator, and set up the PLL to occupy the selected frequency channel.

13. The RFID reader of claim 7, wherein the reader controller is configured to increase the counter value by a predetermined increase value, when the reader controller fails in acquiring tag information from the tag in any one method between the LBT mode and the random access mode.

14. The RFID reader of claim 1, wherein the anti-collision unit determines a reader command message and a communication result to be transmitted to the reader controller based on a response status of the tag that is reported from the reader receiving unit.

15. A method for controlling operation of an RFID reader in an RFID system having a plurality of RFID readers within an operating environment, comprising the steps of:
  a) selecting a random value to select a channel at a different delay time for each RFID reader;
  b) listening as long as the selected random value and, after the listening, occupying a channel for communication with a tag based on a channel occupying mode;
  c) communicating with the tag through the occupied channel; and
  d) processing tag information based on a communication result between the RFID reader and the tag,
  wherein the channel occupying mode comprises a first mode based on an LBT method and a second mode based on a random access method.

16. The method of claim 15, further comprising the steps of:
  e) setting up an initial parameter;
  f) setting up the channel occupying mode for the communication between the RFID reader and the tag; and
  g) performing control to turn off a transmission power source of an RF unit.

17. The method of claim 16, wherein the step a) includes the steps of:
  a1) deciding a counter value for generating a random value;
  a2) generating a random value sequence based on the counter value and a random seed; and
  a3) selecting any one random value from the generated random value sequence.

18. The method of claim 17, wherein the counter value is adaptively decided based on an environment within an operating environment of the RFID reader.

19. The method of claim 18, wherein the counter value deciding step a1) includes the steps of:
  a1-1) when there are a large number of RFID readers within the operating environment, deciding a large counter value; and
  a1-2) when there are a small number of RFID readers within the operating environment, deciding a small counter value.

20. The method of claim 17, wherein a random value sequence is generated within a range of 0 to $2^R-1$ based on the counter value R in the step a2).

21. The method of claim 20, wherein a random seed value is changed for each execution of an algorithm to irregularly generate the random value sequence in the step a2).

22. The method of claim 15, wherein when the random access method is established as the channel occupying mode, the step b) includes the steps of:
  b1) performing control to turn on a transmission power source of an RF unit after listening as long as the selected random value; and
  b2) setting up a PLL to occupy one frequency channel.

23. The method of claim 22, wherein the step b) further includes the step of:
  b3) listening for a predetermined time for stable operation after the PLL deciding step b2).

24. The method of claim 23, wherein a PLL value corresponding to a pre-defined frequency channel is decided in the PLL deciding step b2).

25. The method of claim 23, wherein any one frequency is selected from a channel frequency sequence pre-defined by an operator and a PLL value corresponding to the selected frequency channel is decided in the PLL deciding step b2).

26. The method of claim 15, wherein when the LBT method is established as the channel occupying mode, the step b) includes the steps of:
  b3) generating a frequency channel sequence after listening as long as the selected random value;
  b4) selecting any one channel from the generated frequency channel sequence;
  b5) measuring a Received Signal Strength Indication (RSSI) of the selected channel, and checking whether the selected channel is available;
  b6) when the selected channel is not available, selecting another channel in the frequency channel sequence, and measuring an RSSI of the channel to see if the channel is available; and
  b7) performing control to turn on the transmission power source of the RF unit, when the selected channel is available.

27. The method of claim 17, wherein the step c) includes the steps of:
  c1) performing control to prevent collision among a plurality of tags and acquiring tag information from each tag through the occupied channel; and
  c2) acquiring user data from each tag based on an anti-collision result obtained in the anti-collision step.

28. The method of claim 27, wherein the anti-collision step c1) includes the steps of:
  c1-1) generating a selection command to acquire tag information;
  c1-2) arbitrarily deciding an Q value which indicates the number of slots, checking the presence of a tag response from each slot, and decreasing the number of the slots by the Q value;
  c1-3) initializing the status parameter which indicates the response status of the tag and generating a query command;
  c1-4) when not all the slots are listened to, decreasing the number of slots by the Q value, initializing the status parameter, and generating a query repeat command;
  c1-5) generating an acknowledgement (Ack) when a normal response is received from the tag according to the query command or the query repeat command; and
  c1-6) performing cyclic redundancy check (CRC) onto the data transmitted from the tag and determining the status parameter according to the response status of the tag.

29. The method of claim 28, wherein the status parameter establishment step c1-6) includes the steps of:
  c1-6-1) when the CRC test result shows that the tag data are normal and the tag makes a normal response to the ack command, deciding the status parameter as 'OK,' which indicates that the tag data transmitted from the tag are normally processed;
  c1-6-2) when no response is transmitted from the tag to the ack command, deciding the status parameter as 'No_TAG,' which indicates that the tag does not make a response; and
  c1-6-3) when an error is detected in the CRC test, deciding the status parameter as 'CRC_ERR,' which indicates that there is an error in the CRC.

30. The method of claim 29, wherein when there is no response from the tag to the ack command, the ack command is generated repeatedly by predetermined times, and when the tag does not make a response to the repeated ack commands, the status parameter is decided as 'NO_TAG.'

31. The method of claim 29, wherein when there is an error in the CRC test, the ack command is generated repeatedly by predetermined times, and when there is a CRC error in the tag data even after the repeated ack commands, the status parameter is decided as 'CRC_ERR.'

32. The method of claim 29, wherein when the communication result between the RFID reader and the tag says that the status parameter is not 'OK,' the counter value is increased by a predetermined increase value in the step a).

33. A method for controlling operation of an RFID reader in an RFID system having a plurality of RFID readers within an operating environment, comprising the steps of:
  a) selecting a random value to select a channel at different delay time for each RFID reader;
  b) listening as long as the selected random value and, after the listening, establishing a channel for communication with a tag based on a channel occupying mode;
  c) communicating with the tag through the established channel; and
  d) processing tag information based on a communication result between the RFID reader and the tag,
  wherein the channel occupying mode comprises a first mode based on an LBT method and a second mode based on a random access method.

34. The method of claim 33, wherein the step a) includes the steps of:
  a1) setting up a counter value for generating a random value;
  a2) generating a random value sequence based on the counter value and a random seed; and
  a3) selecting any one random value from the generated random value sequence.

35. The method of claim 34, wherein the counter value is adaptively decided based on an environment within an operating environment of the RFID reader.

36. The method of claim 35, wherein the counter value deciding step a1) includes the steps of:
  a1-1) when there are a large number of RFID readers within the operating environment, deciding a large counter value; and
  a1-2) when there are a small number of RFID readers within the operating environment, deciding a small counter value.

37. The method of claim 35, wherein a random value sequence is generated within a range of 0 to $2^R-1$ based on the counter value R in the step a2).

38. The method of claim 35, wherein a random seed value is changed for each execution of an algorithm to irregularly generate the random value sequence in the step a2).

* * * * *